(12) United States Patent
Prasanna

(10) Patent No.: US 7,839,792 B2
(45) Date of Patent: Nov. 23, 2010

(54) TIME-CORRELATED, SIMULTANEOUS MEASUREMENT AND ANALYSIS OF NETWORK SIGNALS FROM MULTIPLE COMMUNICATION NETWORKS

(75) Inventor: RN Prasanna, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 890 days.

(21) Appl. No.: 11/513,660

(22) Filed: Aug. 30, 2006

(65) Prior Publication Data

US 2007/0047450 A1    Mar. 1, 2007

(51) Int. Cl.
*G01R 31/08* (2006.01)
(52) U.S. Cl. ......................................... 370/241; 702/66
(58) Field of Classification Search ........................ None
See application file for complete search history.

(56) References Cited

U.S. PATENT DOCUMENTS

| | | | | |
|---|---|---|---|---|
| 5,933,129 A | * | 8/1999 | Egami et al. | 345/94 |
| 6,195,617 B1 | * | 2/2001 | Miller | 702/125 |
| 6,311,138 B2 | * | 10/2001 | Miller | 702/67 |
| 7,369,604 B2 | * | 5/2008 | Heath | 375/224 |
| 7,403,560 B2 | * | 7/2008 | Gamper et al. | 375/228 |
| 2001/0001850 A1 | * | 5/2001 | Miller | 702/67 |
| 2004/0052024 A1 | * | 3/2004 | Juntunen et al. | 361/103 |
| 2004/0056210 A1 | * | 3/2004 | Scherer | 250/492.1 |
| 2004/0119620 A1 | * | 6/2004 | Tran et al. | 341/126 |
| 2005/0175079 A1 | * | 8/2005 | Gamper et al. | 375/228 |

* cited by examiner

*Primary Examiner*—Bob A Phunkulh
(74) *Attorney, Agent, or Firm*—Thomas F. Lenihan; Francis I. Gray

(57) ABSTRACT

A system and a method for simultaneous measurement and analysis of network signals on multiple communication networks are described. Accordingly, in one embodiment, the system accepts signals from two communication networks. The two networks may be following different protocols. A time-correlated measurement of corresponding frames of two protocols may be provided. Information pertaining to message frames of different networks may be displayed simultaneously.

9 Claims, 4 Drawing Sheets

TIME-CORRELATED, SIMULTANEOUS MEASUREMENT AND ANALYSIS OF NETWORK SIGNALS FROM MULTIPLE COMMUNICATION NETWORKS

CLAIM FOR PRIORITY

The subject patent application claims priority under 35 U.S.C. 119 from Indian Provisional Patent Application No. 1046-MUM-2005, entitled TIME-CORRELATED, SIMULTANEOUS MEASUREMENT AND ANALYSIS OF NETWORK SIGNALS FROM MULTIPLE COMMUNICATION NETWORKS, filed 30 Aug. 2005, and from a Regular Indian Patent Application No. 1046-MUM-2005, entitled TIME-CORRELATED, SIMULTANEOUS MEASUREMENT AND ANALYSIS OF NETWORK SIGNALS FROM MULTIPLE COMMUNICATION NETWORKS, filed 24 Aug. 2006. Both of the above-identified Indian patent documents are assigned to the same assignee as the subject application.

FIELD OF THE INVENTION

The present invention relates generally to a digital storage oscilloscope and more particularly to data traffic analysis in a small-scale distributed environment.

BACKGROUND OF THE INVENTION

Complex systems may require utilizing various communication networks. Multiple networks are used in any system to conquer and simplify the complexity of controlling all the sub-parts of the systems together. The complexity of the systems calls for having different protocols and different networks based on the data transmission speed. To optimize costs and to control data access, multiple networks in applications such as in single vehicle are becoming common.

Usually networks such as a Controller Area Network (CAN) are used as a master network in such implementations. A Controller Area Network (CAN) is a communication network for message transaction in a small-scale distributed environment. Usually, a CAN network is used for transferring the information to and from the sensors and actuators in a system or sub-system for real-time control applications. It is used extensively in the automotive and control systems to transmit and receive messages across different electronic control units (nodes). Further, sub-parts of the systems may be controlled by another protocol such as Local Interconnect Network (LIN) protocol. Each protocol may operate on a network of its own.

The networks operating on different protocols may communicate through a gateway. For example, as shown in FIG. 1, the CAN network 103 may communicate with LIN network 109 through CAN to LIN Electronic control unit 107. The CAN to LIN Electronic control unit 107 translates the protocol information of one protocol to another protocol.

Also, in a CAN network, different data speeds may be used based on the application of that segment of the network. Customers need to ensure that communication across the gateway is accurate and timely. Engineers may also need to monitor the delays in communication between the CAN to LIN buses and vice versa of the network. Each of the networks of the system may operate at different speeds. For example, the CAN protocol may operate from 10 Kbps to 1 Mbps, whereas the LIN protocol may operate at 20 kbps.

Vehicles may use protocols such as CAN and LIN for their internal communication as shown in FIG. 2. The LIN network operating at lower frequencies may be used in controlling communications within car doors 203a, 203b, 203c, and 203d. The CAN protocol may operate as a master protocol and may be used for display of overall communication system in the car. The information from various sub networks, such as LIN networks in the car doors 203a, 203b, 203c, 203d may be obtained by the CAN network to update the information at the dashboard. A delay between the CAN and LIN network may affect the operation of an action initiated by the user at the dashboard. Further such a delay may lead to late updating of information at the dashboard in response to an already completed action in LIN network. Similarly, the delay between the networks may affect the movement of gears that control the light position.

An engineer usually needs to design a system for optimum performance of inter-network communication. Usually the measurement and analysis of signals belonging to different networks needs to be carried out separately. Also, the numerous amount of data being monitored needs to be characterized and classified.

Therefore, there is a need of an efficient method of measuring and analyzing signals belonging to different networks.

SUMMARY OF THE INVENTION

A system and a method for simultaneous measurement and analysis of network signals on multiple communication networks are described. Accordingly, in one embodiment, the system accepts signals from two communication networks. The two networks may be following different protocols. A time-correlated measurement of corresponding frames of two protocols may be provided. Information pertaining to message frames of different networks may be displayed simultaneously.

Networks signals being analyzed may follow different protocols. For example, signals from a network following a CAN protocol may be analyzed simultaneously with signals from a network following a LIN protocol. Alternatively, signals from other similar networks may be analyzed. For example, signals from CAN networks of different types may be analyzed simultaneously. The signals analyzed may also be correlated.

The invention can be implemented within multiple types of digital storage oscilloscopes. Further, the invention is applicable to various standards of CAN, such as for example, standard and extended CAN message formats.

The method lists the message frame information pertaining to different protocols. The listing feature allows correlating related message of one protocol to another protocol message frame on the same window. This enables the customer to correlate the protocol messages as they traverse through the listing.

Features may be provided for searching the message frames based on a search criterion. This helps in quickly locating a desired message frame. Further, the method allows for filtering of message frames over a period of time. This enables the user to filter the selected message and view the progress of the data transfer of the selected message.

Various measurements may be made available to the user in form of a display. The display may provide for a quick and easily comprehensive detail of measurements allowing the designer to take further steps in optimizing the network and to quickly spot the error in inter-network communication. This helps in designing a reliable multiple network system.

BRIEF DESCRIPTION OF THE DRAWING

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system and a method for simultaneous measurement and analysis of network signals on multiple communication networks are described. Accordingly, in one embodiment, the system accepts signals from two communication networks. The two networks may be following different protocols. A time-correlated measurement of corresponding frames of two protocols may be provided.

The method allows for simultaneous analysis of multiple network protocols. Response of a protocol to an action initiated by another protocol may be monitored. Exclusive analysis of acquired information based on various types of message frames may also be carried. The various measurements made may be made available for simultaneous viewing in form of correlating entries for quick analysis of the data.

The invention described herein is explained using specific exemplary details for better understanding. However, the invention disclosed can be worked on by a person skilled in the art without the use of these specific details. The invention can be implemented into a multiple types of digital storage oscilloscopes. Further, the invention is applicable to various communication networks such as Controller Area Network (CAN). Structures and devices shown in block diagram are illustrative of exemplary embodiments of the invention and are meant to avoid obscuring the invention. Also, the connections between various network elements may not necessarily be direct and the data transfer in between can be subjected to encoding, re-formatting or modifications.

References in the specification to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
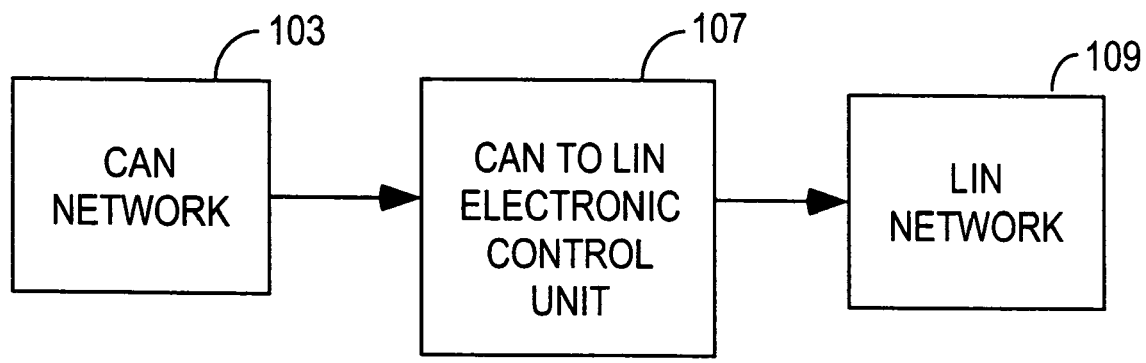
FIG. 1 illustrates a communication interface between two communication networks.
Figure 2:
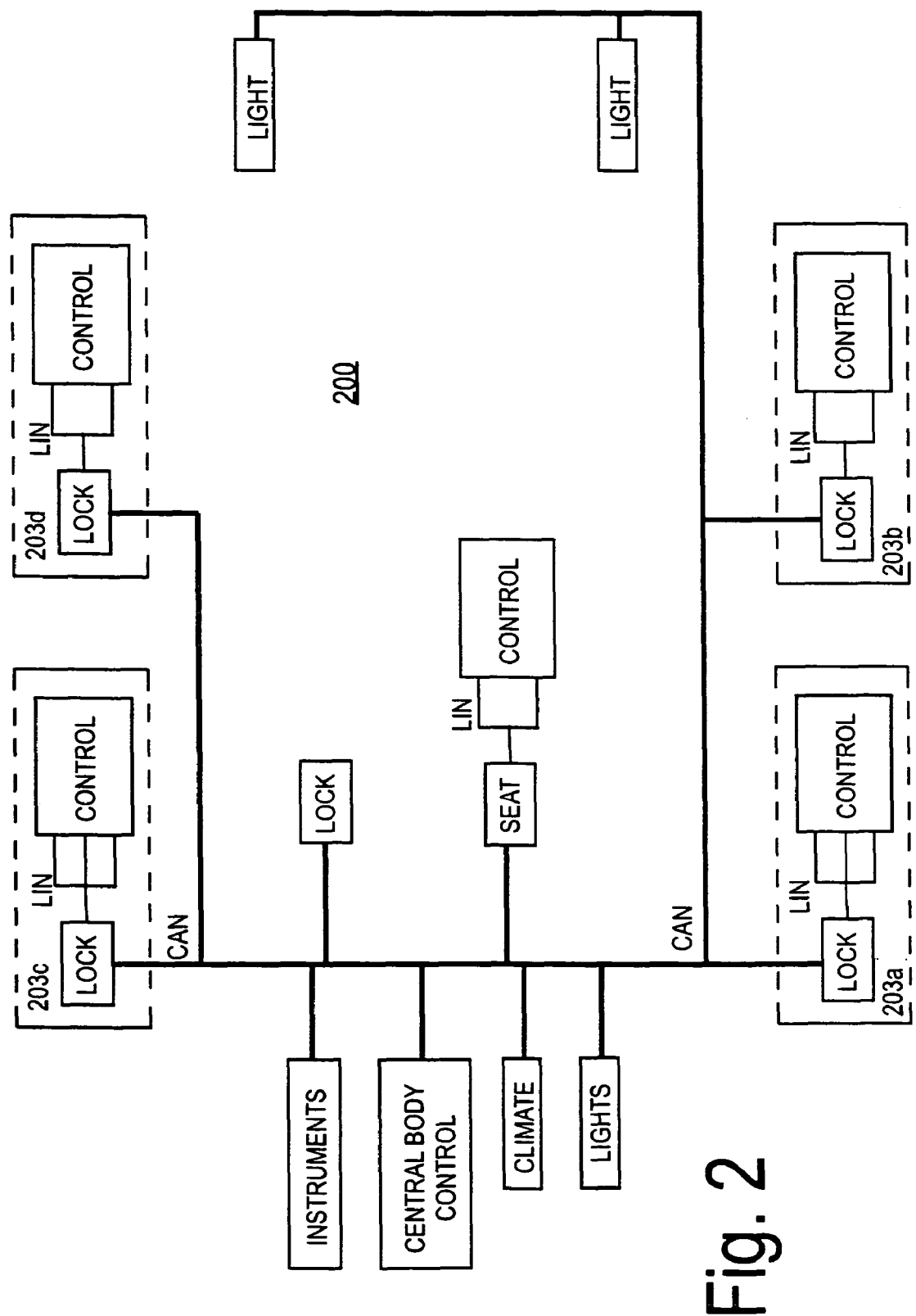
FIG. 2 illustrates a system utilizing multiple communication networks in a vehicle.
Figure 3:
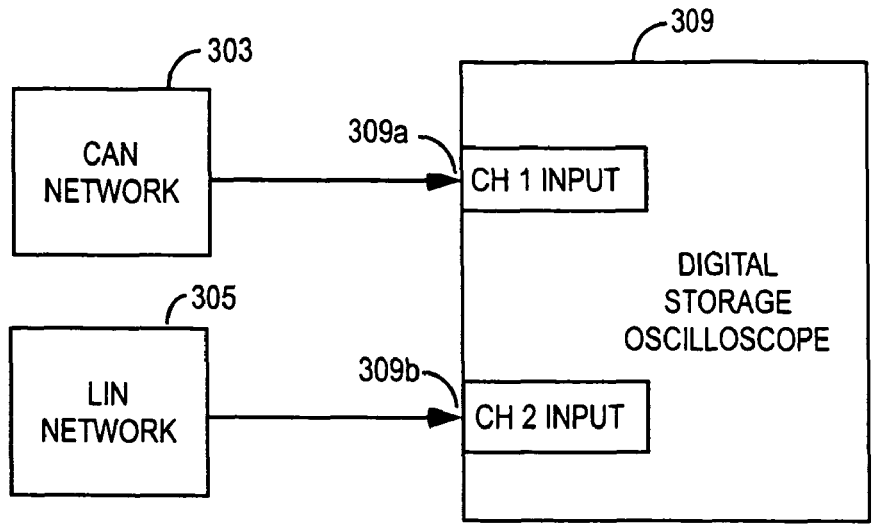
FIG. 3 shows an exemplary setup for measurement and analysis as per one embodiment of the present invention.

FIG. 3 illustrates an exemplary general set up for measurement and analysis of network signals from multiple networks. Accordingly, signals from networks may be acquired in a digital storage oscilloscope 309. In this exemplary setup a CAN network 303 signals and a LIN network 305 signals may be simultaneously measured and analyzed. The CAN bus signal may be differential or single ended. The type of CAN bus signal may depend on the type of the CAN bus transceiver.

The signal from each network may be input at respective channels. For e.g. the CAN network 303 signal may be input at channel 1 309a of the Digital storage oscilloscope 309. The channel 2 input 309b may be used for accepting the signals from the LIN network 305. The acquired signals may be processed further to obtain and analyze information corresponding to each network.

Networks signals being analyzed may follow different protocols. For example, signals from network following a CAN protocol may be analyzed simultaneously with the signals from a network following a LIN protocol. Alternatively, signals from similar networks may be acquired. For example, signals from CAN networks of different types may be analyzed simultaneously. The signals analyzed may also be correlated.

Figure 4:
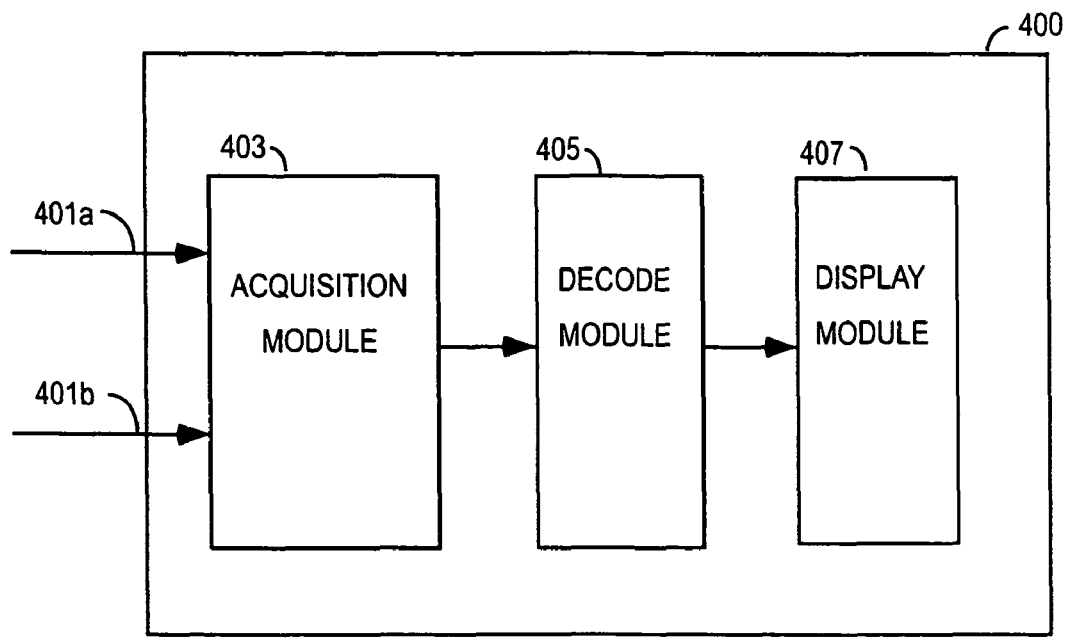
FIG. 4 shows a block diagram of system for measurement and analysis as per one embodiment of the present invention.

FIG. 4 illustrates a block diagram of a system for simultaneous measurement and analysis of network signals as per one embodiment of the present invention. The system 400 may comprise of various modules. Simultaneous acquisition of signals from multiple networks may be made at the acquisition module 403. Signals 401a and 401b may be input from various networks. For example, signals input to system 400 may be from a CAN network and a LIN network.

The acquired signal 401a and signal 401b may be input to a decoding module 405. Various frame based information obtained from the decoded signal may be utilized in time correlating the signals from different networks.

Information obtained in a decoding module may be further fed to a display module 407. Signal information in form of acquired signal may be made viewable in the display module. Further, information processed in the display module may be made available in form of arranged and correlated set of data.

The system for simultaneous measurement and analysis of network signals from multiple networks may be integrated in an oscilloscope.

Figure 5:
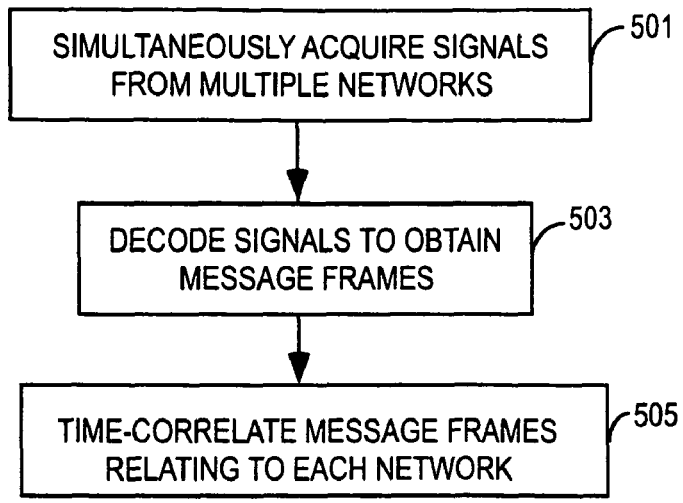
FIG. 5 is a flowchart of method of measuring and analyzing as per one embodiment of the present invention.

FIG. 5 illustrates the method for measurement and analysis of network signals from multiple networks as per one embodiment of the present invention. Various networks requiring simultaneous measurement and analysis may be connected to an oscilloscope. Simultaneous acquisition of the signals 501 is carried out. The acquisition from these networks may take place using a same time base. Signals from these networks may be utilized in understanding the inter-network communication. A trigger model may be defined to initiate the acquisition of signals. For example, the trigger model may be based on the type of message frame encountered.

The acquired signal may be in form of waveforms. The decoding of signals to obtain message frames 503 may be carried out. Accordingly, the waveforms may be converted into a stream of bits with known data rate. Various algorithms such as for example, the CAN message decoding algorithm may be used in decoding the signals. In an implementation using LIN network break and synch fields may be identified to decode the LIN signals.

Frame information may be obtained from the decoded bit streams of the signals. For example, in an implementation acquiring CAN signals the obtained message frames may be a data frame, remote frame, error frame or an overload frame. Each message frame identified may then be arranged with corresponding timing information in form of a "time stamp".

Using the information on various message frames and the corresponding "time stamp" the message frames from different networks may be time-correlated 505. In an exemplary implementation, message frames from a CAN network which may be acting as a master network, may be time correlated with the corresponding message frame in a LIN network. A LIN network may act as a slave network to the CAN network.

In this scenario signals in LIN network in response to the action initiated by the CAN network may be measured and analyzed. The message frames analysis may be carried on a same time base. Further, the correlated message frames may be used in calculating the time stamp difference. Alternatively, the users may also calculate the time stamp difference manually between the messages. This information may be used in effectively troubleshooting the communication system between the networks. Also, the designers of a communication network utilizing more than one communication network may utilize to optimize the performance of such system.

Figure 6:
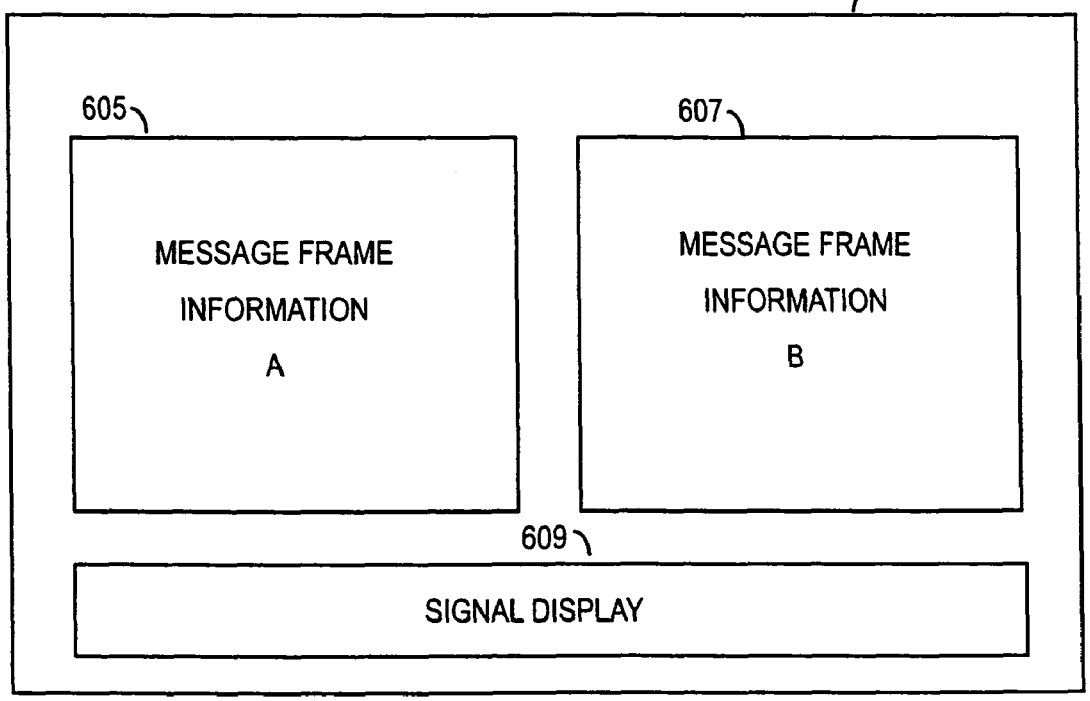
FIG. 6 shows a display module as per one embodiment of the present invention.

Information pertaining to message frames of different networks may be displayed in a display module as per one embodiment of the present invention as shown in FIG. 6. Various information, such as for example, the frame information of individual networks may be displayed in form of a list. Correlated message frames of different networks may also be interrelated.

The display module 622 may comprise of various information such as type of message frame and the corresponding time stamp. Simultaneous listing of information corresponding to different networks may help an engineer in effectively monitoring action and response in such communication system.

On selecting a particular message frame information in Message frame information window corresponding frame information in another message frame information window may be obtained. For example, on selecting a message frame information in message frame information-B window 607, the nearest message frame information in Message frame information-A window 605 may be obtained. The obtained information may be highlighted to give the user a quick understanding of the inter-communication.

Further, the correlated messages may be tracked in reverse. That is, the origin of a message may be tracked from the message information of the network that obtains the communication from another network. This may further help in understanding the sequence of message flow.

On selecting a message frame information in the frame information window a corresponding signal may be displayed. The signal in form of waveform may be made available in signal display window 609.

The list of message frames may be searched based on a criterion by the user. On entering a search criteria entry in the list satisfying the search criteria may be highlighted. This enables the user to quickly and easily spot the message frames of interest. A set of message frames over a period of time may also be searched among the list. The progress of data transfer may thus be observed and analyzed from the message frame information over the period of time specified by the user.

The foregoing description of the invention has been described for purposes of clarity and understanding. It is not intended to limit the invention to the precise form disclosed. Various modifications may be possible within the scope and equivalence of the appended claims.

I claim:

1. A method, for use in a digital storage oscilloscope, for measurement and analysis of network signals from multiple networks, the method comprising steps of:
   simultaneously acquiring signals from multiple networks;
   decoding the acquired signals to obtain message frames; and
   time-correlating the message frames relating to each network;
   wherein the acquisition, decoding and time-correlation is carried out in said digital storage oscilloscope.

2. The method as in claim 1, wherein the acquisition of signals from multiple networks are carried on a common time-base.

3. The method as in claim 1, wherein the networks operate on a different protocol.

4. The method as in claim 1, wherein the acquisition of signals is based on a trigger model.

5. The method as in claim 1, further comprising the step of:
   displaying simultaneously message frame information of multiple networks.

6. The method as in claim 5, wherein the message frame information of one network is displayed with the corresponding signal information.

7. The method as in claim 5, wherein the message frame information of one network is displayed with corresponding message frame information of another network.

8. The method as in claim 1, wherein at least one network is a CAN network.

9. The method as in claim 1, wherein at least one network is a LIN network.

* * * * *